(12) United States Patent
Nii et al.

(10) Patent No.: US 10,220,550 B2
(45) Date of Patent: Mar. 5, 2019

(54) SEAT STRUCTURE MEMBER AND MANUFACTURING METHOD OF SAME

(71) Applicant: TOYOTA BOSHOKU KABUSHIKI KAISHA, Aichi-ken (JP)

(72) Inventors: Tomoki Nii, Aichi-ken (JP); Yoshiyuki Murata, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 402 days.

(21) Appl. No.: 15/095,790

(22) Filed: Apr. 11, 2016

(65) Prior Publication Data

US 2016/0221231 A1   Aug. 4, 2016

Related U.S. Application Data

(62) Division of application No. 14/190,532, filed on Feb. 26, 2014, now Pat. No. 9,333,686.

(30) Foreign Application Priority Data

Feb. 27, 2013   (JP) ................................. 2013-037172

(51) Int. Cl.
*B29C 67/00* (2017.01)
*B29C 44/12* (2006.01)
(Continued)

(52) U.S. Cl.
CPC ............ *B29C 44/12* (2013.01); *B29C 44/582* (2013.01); *B29C 44/583* (2013.01); *B60N 2/58* (2013.01);
(Continued)

(58) Field of Classification Search
CPC .... B29C 44/125; B29C 44/582; B29C 44/583
See application file for complete search history.

(56) References Cited

U.S. PATENT DOCUMENTS

| 3,331,089 A | 7/1967 | Ornas, Jr. et al. |
| 3,337,884 A | 8/1967 | Meier |

(Continued)

FOREIGN PATENT DOCUMENTS

| CN | 101193575 | 6/2008 |
| CN | 101854836 | 10/2010 |

(Continued)

OTHER PUBLICATIONS

Official Action, along with English-language translation thereof, for JP2013-037172 drafted Jun. 6, 2016.

(Continued)

*Primary Examiner* — Kelly M Gambetta
(74) *Attorney, Agent, or Firm* — Greenblum & Bernstein, P.L.C.

(57) ABSTRACT

A manufacturing method of a seat structure member includes forming a protrusion that protrudes inward on an inside surface of a portion that forms a foaming chamber for a seat pad, on one die and another die that form the foaming chamber. Applying, to a cover, a region that will not be integrated with the seat pad when the seat pad is foam molded, at a location on the cover that corresponds to a location of the protrusion when placing the cover on the inside surface of the foaming chamber. The method further includes arranging the cover following a shape of the protrusion and foam molding the seat pad and forming a space of a recessed portion between the seat pad and the cover, by releasing the one die and the other die after foam molding the seat pad.

6 Claims, 4 Drawing Sheets

(51) Int. Cl.
*B29C 44/58* (2006.01)
*B60N 2/58* (2006.01)
*B60N 2/60* (2006.01)
*B60N 2/70* (2006.01)
B29K 105/04 (2006.01)
B29L 31/58 (2006.01)
B29L 31/00 (2006.01)

(52) U.S. Cl.
CPC ......... *B60N 2/6009* (2013.01); *B60N 2/7017* (2013.01); *B29K 2105/04* (2013.01); *B29L 2031/58* (2013.01); *B29L 2031/771* (2013.01)

(56) References Cited

U.S. PATENT DOCUMENTS

| | | | |
|---|---|---|---|
| 4,143,435 A | 3/1979 | Masuda | |
| 4,860,415 A | 8/1989 | Witzke | |
| 5,061,419 A * | 10/1991 | Kouda | B29C 33/48 |
| | | | 249/184 |
| 5,460,873 A * | 10/1995 | Ogawa | B29C 44/1261 |
| | | | 428/316.6 |
| 5,654,069 A | 8/1997 | Matsuoka et al. | |
| 5,816,661 A | 10/1998 | Sakurai et al. | |
| 7,549,708 B2 | 6/2009 | Wieczorek et al. | |
| 2005/0168037 A1 | 8/2005 | Runde | |
| 2008/0111409 A1 | 5/2008 | Wieczorek et al. | |

FOREIGN PATENT DOCUMENTS

| | | |
|---|---|---|
| CN | 102307749 | 1/2012 |
| JP | 56-089926 | 7/1981 |
| JP | 63-79799 | 5/1988 |
| JP | 2-292006 | 12/1990 |
| JP | 11-56520 | 3/1999 |
| JP | 2005-192635 | 7/2005 |

OTHER PUBLICATIONS

Official Action, with partial English-language translation thereof, for CN Pat. App. No. 201410064975.0 dated Oct. 10, 2015.

* cited by examiner

SEAT STRUCTURE MEMBER AND MANUFACTURING METHOD OF SAME

CROSS-REFERENCE TO RELATED APPLICATION

This is a divisional application of pending U.S. patent application Ser. No. 14/190,532, filed on Feb. 26, 2014, which claims priority to Japanese Application No. 2013-037172, filed Feb. 27, 2013. The disclosures of these documents, including the specifications, drawings and claims, are incorporated herein by reference in their entirety.

INCORPORATION BY REFERENCE

The disclosure of Japanese Patent Application No. 2013-037172 filed on Feb. 27, 2013 including the specification, drawings and abstract is incorporated herein by reference in its entirety.

BACKGROUND OF THE INVENTION

1. Field of the Invention

The invention relates to a seat structure member and a manufacturing method thereof. More particularly, the invention relates to a seat structure member in which a cover and a seat pad of a seat for a vehicle such as an automobile are integrated when the seat pad is foam molded, as well as a manufacturing method of this seat structure member.

2. Description of Related Art

A vehicle seat includes a seat cushion and a seat pad as main components. A seat structure member that forms this seat cushion or a seat back is formed by covering a seat pad of foam urethane or the like with a cover. This type of seat structure member is typically used in a foam molded seat with an integrated cover (hereinafter also referred to as a "cover integrated foam molded seat"), in which the cover is integrally molded when the seat pad is foam molded, because of the convenience of handling and the like at the time of assembly. Therefore, the cover is integrated with the seat pad so that it can be handled as a single part, thus facilitating handling, as well as to improve the appearance (see Japanese Patent Application Publication No. 2005-192635 (JP 2005-192635 A) below). Meanwhile, a seat slide mechanism and a height adjustment mechanism are arranged on a lower portion of a seat cushion, and a reclining mechanism for tilting a seat back is arranged on a connecting portion of the seat cushion and the seat back. To cover these mechanisms and improve the appearance of the overall seat, a shield that serves as a design cover is arranged around the lower side of the seat cushion. This shield is arranged extending from a front surface side of the seat cushion to a side surface side of the seat cushion. As a result, various seat equipment is covered by the shield arranged on the lower portion, together with the seat structure member of the cover integrated foam molded seat described above that is arranged on the upper portion of the seat cushion, thereby improving the appearance of the overall seat.

SUMMARY OF THE INVENTION

In the arrangement configuration of the shield and the seat structure member of the cover integrated foam molded seat described above, from the viewpoint of appearance, an end edge of an upper edge of the shield is arranged contacting the cover without a gap in between. The shield is arranged fixed in the vertical direction to a base portion of the seat cushion, but the seat structure member of the cover is arranged so as to be able to move in the vertical direction by the height adjustment mechanism. Therefore, the end edge of the shield and the cover are arranged in relative sliding contact with one another. With this relative sliding contact, the cover is rubbed on in a strong frictional contact state from the spring force of the seat pad because it (i.e., the cover) is integrated by the foam molding of the seat pad. Therefore, the cover may become damaged, which may adversely affect the appearance, and an abnormal noise may be produced.

The invention thus provides a cover integrated foam molded seat in which the cover is able to easily bend (flex), by providing a recessed space (i.e., a space formed by a recessed portion) between the seat pad and the cover at a location where another member contacts the cover, as well as a manufacturing method of this cover integrated foam molded seat.

A first aspect of the invention relates to a seat structure member that includes a cover and a seat pad. The cover and the seat pad are integrated when the seat pad is foam molded. A recessed portion is formed on a portion of a surface of the seat pad that is covered by the cover. Integrated molding of the seat pad and the cover is avoided at a location of the recessed portion, and a space of the recessed portion is formed between the seat pad and the cover.

According to this aspect, a recessed portion having a space where integrated molding is avoided is provided between the seat pad and the cover, on a portion of the surface of the seat pad. Therefore, even if another member contacts the cover at a location where the space is provided by the recessed portion, the cover is able to easily bend, so the cover will not be damaged by friction (i.e., rubbing) or the like. As a result, the appearance of the cover is able to be well maintained for a long time.

In the aspect described above, a position of the recessed portion formed on the surface of the seat pad may be a location other than a contact surface that is contacted by an occupant when the occupant is seated. With this structure, the seating comfort of the seat as felt by the seated occupant will not be affected much.

In the aspect described above, a position of the recessed portion formed on the surface of the seat pad may be a position corresponding to a position of an end edge of a shield arranged on an outside surface of a seat. Also, in the aspect described above, the seat pad may be used in a seat cushion, and the recessed portion may be formed on a joining portion of the seat cushion, which joins with a seat back at a rear portion of the seat cushion. With this structure, good design of the overall seat is able to be maintained for a long time.

Also in the aspect described above, the seat structure member may also include a film through which foam material is unable to pass, and integrated molding of the seat pad and the cover may be avoided by arranging the film between the seat pad and the cover.

Furthermore, a second aspect of the invention relates to a manufacturing method of a seat structure member. This manufacturing method includes forming a protrusion that protrudes inward on an inside surface of a portion that forms a foaming chamber for a seat pad, on one die and another die that form the foaming chamber; applying, to a cover, means that will not be integrated with the seat pad when the seat pad is foam molded, at a location on the cover that corresponds to a location of the protrusion when placing the cover on the inside surface of the foaming chamber; arranging the cover following a shape of the protrusion and foam molding the seat pad; and forming a space of a recessed portion between the seat pad and the cover, by releasing the one die and the other die after foam molding the seat pad. This manufacturing method makes it possible to manufacture a seat structure member in which a space of a recessed portion is formed between the cover and the surface of the seat pad, by forming a protrusion that protrudes inward on a portion of the inside surface of a forming die that forms a foaming chamber, applying means that will not be integrated with the seat pad when the seat pad is foam molded, to the cover at a location corresponding to the location of this protrusion, and foam molding the seat pad.

As described in the first and second aspects of the invention, in a cover integrated foam molded seat, the cover is able to easily bend by providing a space of a recessed portion between the seat pad and the cover at a location where another member contacts the cover, and is thus able to be kept in a good state for a long time even if another member contacts the cover at that location.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an example embodiment for carrying out the invention will be described with reference to the accompanying drawings. This example embodiment illustrates a case of a seat structure member 14 of a seat cushion 10 of a vehicle seat.

Figure 1:
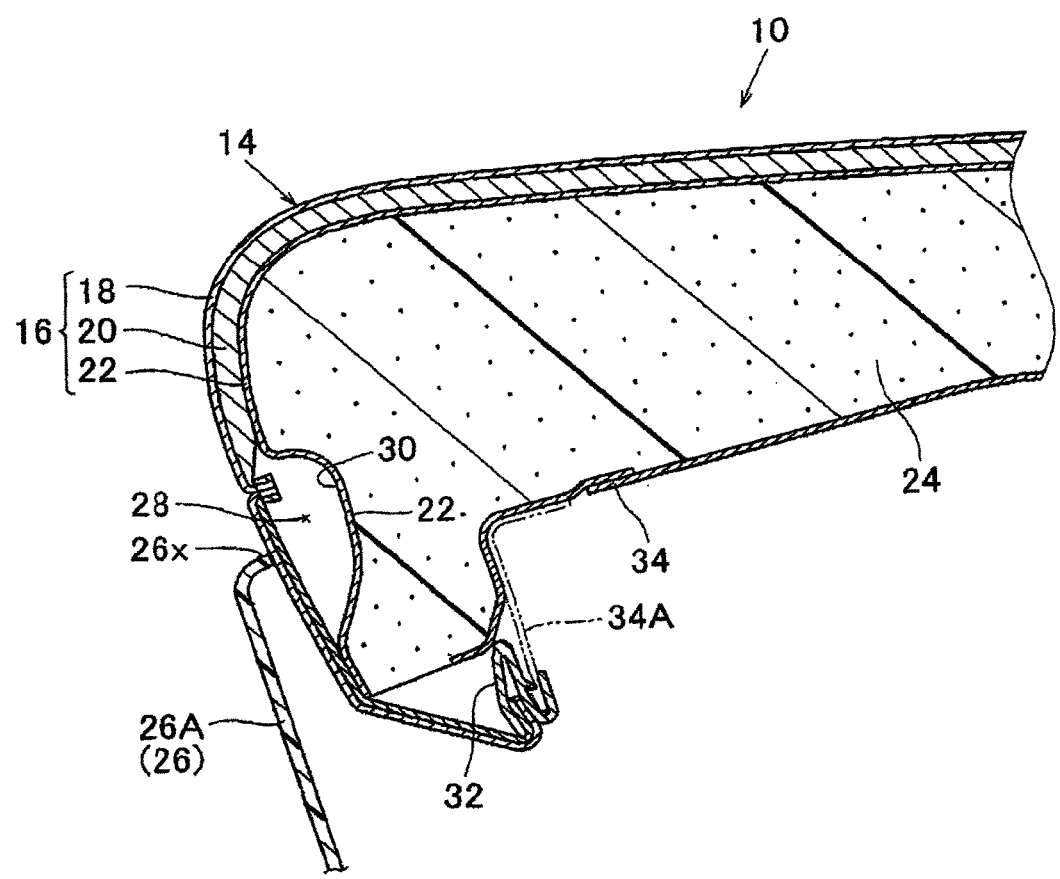
FIG. 1 is a sectional view of a front portion of a seat cushion illustrating one example embodiment of a seat structure member of the invention.

The vehicle seat normally includes the seat cushion 10 and a seat back. FIG. 1 is a sectional view of a front portion of the seat cushion 10. The seat structure member 14 on an upper portion of the seat cushion 10 is formed by a seat cover 16 and a seat pad 24 that are integrally molded by integrated foam molding. The seat cover 16 has a three-layer structure. The three layers, i.e., a cover 18, a soft laminate middle member 20, and a low air permeable laminate back surface member 22, are laminated together in this order from a surface side so as to be integrally formed in advance. The three layered seat cover 16 that includes this cover 18 is integrally molded with the seat pad 24 when the seat pad 24 is foam molded. The cover 18 has a good appearance as it tends not to wrinkle and the like even when used, due to it being integrally foam molded with the seat pad 24. In addition, the cover 18 is easy to handle when assembling the seat. A height adjustment mechanism, not shown, is provided on a lower portion of the seat cushion 10, so the height of the front portion of the seat cushion 10 is able to be adjusted according to a seated person (also referred to as a "seated occupant"). Also, a seat slide mechanism, also not shown, is also arranged on a lower portion of the seat cushion 10, so the position of the entire seat in the front—back direction is also able to be adjusted according to the seated person. A shield 26 is arranged in a position below a front surface portion and a side surface portion of the seat cushion 10 to cover and hide these mechanisms. A front shield 26A that is arranged in a position below the front surface portion of the seat cushion 10 is shown in FIG. 1. As a result, the mechanisms arranged on the lower portion of the seat cushion 10 are unable to be seen from the outside, so the appearance of the entire seat is good. The front shield 26A is attached to a base portion of the seat that does not move in the vertical direction, so the seat cushion 10 is displaced relative to the front shield 26A when the seat cushion 10 is adjusted and moved in the height direction.

As shown in FIG. 1, an end edge 26x of an upper end the front shield 26A is arranged contacting the cover 18 of the seat cover 16 with no gap therebetween in order to improve the appearance. Therefore, there is sliding contact between the end edge 26x of the front shield 26A and the cover 18 of the seat cover 16 at this area following the relative displacement of the seat cushion 10 and the front shield 26A. A recessed portion 30 in which the shape of the surface of the seat pad 24 is recessed inward is formed in a position of the seat pad 24 that corresponds to the position of the cover 18 where the end edge 26x of the upper end of this front shield 26A contacts the cover 18. A portion of the seat cover 16 that corresponds to the location where the recessed portion 30 is formed is configured such that the low air permeable laminate back surface member 22 and the soft laminate middle member 20 are not integrated but are instead able to separate. Therefore, when the seat pad 24 is foam molded, the back surface member 22 and the seat pad 24 become a single integrated unit, a space 28 of the recessed portion 30 is formed between the back surface member 22 and the middle member 20. The cover 18 and the soft laminate middle member 20 are integrally formed in advance, and are arranged following the shape of the surface of the seat pad 24, except for the recessed portion 30, by the tension thereof. More specifically, in this example embodiment, the middle member 20 and the back surface member 22 of the seat cover 16 that are arranged in a position lower than the position where the recessed portion 30 is formed, when viewed in FIG. 1, are separated until their terminal ends (i.e., the terminal ends of these members 20 and 22). Also, the back surface member 22 is integrated with the seat pad 24 by foam molding the seat pad 24, so the middle member 20 and the cover 18 that are integrally formed in advance are fixed by being attached in a state in which tension is applied to a retaining portion 34A of a seat frame 34 by a retaining clip 32 that is attached to the end portion. As a result, the space 28 is formed at the location of the recessed portion 30 of the seat pad 24, between the cover 18 and the seat pad 24. This space 28 is specifically formed between the back surface member 22 and the middle member 20 of the seat cover 16 at the position of the recessed portion 30 of the seat pad 24. The foam material of the seat pad 24 will not pass through the back surface member 22 and penetrate to the position of the middle member 20 during the foam molding when the seat cover 16 is integrated with the seat pad 24 when the seat pad 24 is foam molded, because the back surface member 22 of the seat cover 16 is formed by a low air permeable laminate.

As described above, when the space 28 resulting from the recessed portion 30 of the seat pad 24 is formed in a location on the back side of the cover 18 where the end edge 26x of the upper end of the front shield 26A slidingly contacts the cover 18, the cover 18 and the soft laminate middle member 20 are able to bend easily. Therefore, even if the cover 18 slidingly contacts, and is thus rubbed on by, the end edge 26x of the upper end of the front shield 26A due to the height of the front portion of the seat cushion 10 being adjusted, the cover 18 is still able to easily bend, so damage to the cover 18 from this friction (i.e., rubbing) is able to be inhibited. Also, in the example embodiment described above, the position where the recessed portion 30 is formed on the seat pad 24 is a position on the front surface side of the seat cushion 10. This position is a location other than a contact surface that the seated occupant contacts when seated, so the seating comfort of the seat as felt by the seated person will not be affected much.

Figure 2:
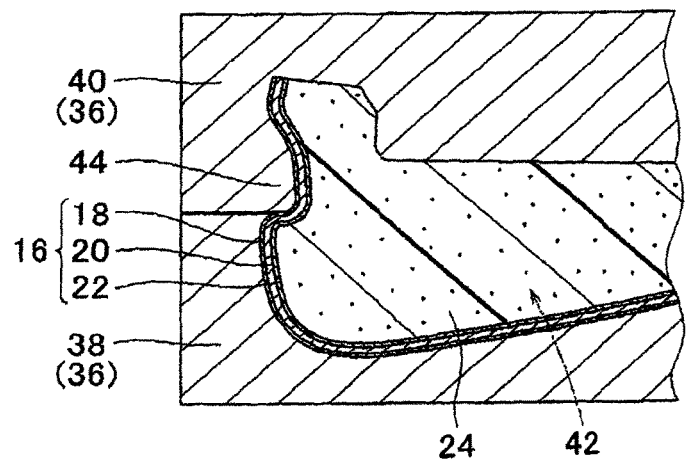
FIG. 2 is a sectional view showing a frame format of a state in which the seat structure member is integrally foam molded by a forming die that includes an upper die and a lower die.
Figure 3:
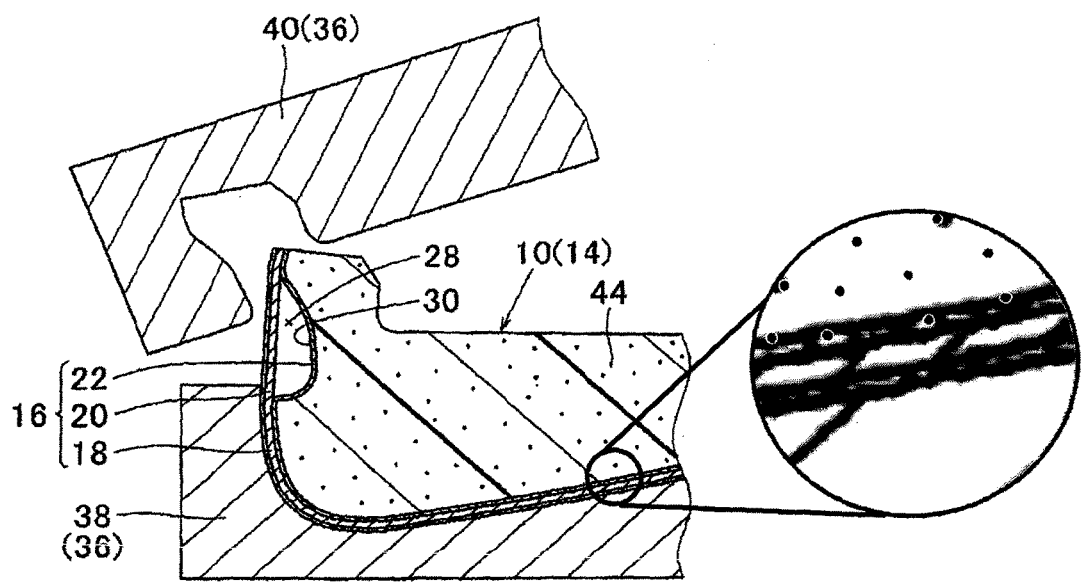
FIG. 3 is a sectional view of a frame format showing a state in which the seat structure member is released after being integrally foam molded by the forming die that includes the upper die and the lower die.

Next, a manufacturing method of the seat structure member 14 that forms the seat cushion 10 described above will be described. FIG. 2 is a view showing a frame format of a state in which the seat structure member 14 is integrally foam molded by a forming die 36. FIG. 3 is a sectional view of a frame format showing a state in which the seat structure member 14 is released after being integrally foam molded. The forming die 36 includes a lower die 38 and an upper die 40, and has a foaming chamber (a cavity) 42 formed inside, as shown in FIG. 2. The shape of the space of the foaming chamber 42 corresponds to the shape of the seat pad 24 after forming. More specifically, the shape of the space of the foaming chamber 42 is a shape that superficially covers the seat cover 16. The shape of the foaming chamber 42 in FIG. 2 is such that the vertical position of the seat structure member 14 of the seat cushion 10 shown in FIG. 1 is inverted. That is, the positional relationship is one in which the lower surface side of the lower die 38 will become the upper surface side of the seat cushion 10. The forming die 36 is formed with a protrusion 44 corresponding to the shape of the recessed portion 30 of the seat pad 24, formed in a position corresponding to the recessed portion 30, in the foaming chamber 42 of the upper die 40. One of the lower die 38 and the upper die 40 in this example embodiment is an example of one die of the invention, and the other is an example of the other die of the invention. This forming die 36 (i.e., both the lower die 38 and the upper die 40) is made of aluminum.

The seat cover 16 is formed in advance. The basic structure of the seat cover 16 is one in which the cover 18, the soft laminate middle member 20, and the low air permeable laminate back surface member 22 are integrally laminated together in order from the surface layer side. However, the middle member 20 and the back surface member 22 of the seat cover 16 that are arranged at the position of the protrusion 44 of the upper die 40 are not integrated together, but are instead able to separate. In this example embodiment, the middle member 20 and the back surface member 22 at a portion of the seat cover 16 arranged in a position higher than the position of the protrusion 44 shown in FIG. 2 are not integrated together, but are instead able to separate. When integrally foam molding the seat pad 24 and the seat cover 16 including the cover 18, first the seat cover 16 is placed on the inside surface of the foaming chamber 42 that is formed by matching (i.e., joining) the lower die 38 with the upper die 40. At this time, the seat cover 16 is placed such that a portion where the back surface member 22 and the middle member 20 are not integrated together but are instead able to separate is positioned at the position of the protrusion 44 of the upper die 40. Then a foaming liquid is poured into the foaming chamber 42 into which the seat cover 16 has been placed. In order to perform this operation, more specifically, the upper die 40 is formed divided into a first upper die 40 at a location of the portion where the seat cover 16 is placed, and a second upper die 40 at a location of the other portion. FIG. 2, however, is a view showing a frame format and is thus simplified so this is not shown. The seat cover 16 is placed on the inside surface in the foaming chamber 42 from the location where the second upper die 40 that is not yet matched is to be arranged, while the first upper die 40 is matched with the lower die 38, and the foaming liquid is poured in. Then, the second upper die 40 is matched, thereby closing and forming the foaming chamber 42. The lower die 38, the first upper die 40, and the second upper die 40 that together form the forming die 36 are pivotally connected together by a hinge mechanism. Therefore, first, the first upper die 40 is able to be matched to the lower die 38 by being pivoted, and in this state, the seat cover 16 is placed in. Then the foaming liquid is poured in. Next, the second upper die 40 is pivoted so as to be matched up, thereby closing the foaming chamber 42 so foam molding can be performed.

In this state, the forming die 36 is heated and foam molding is performed. When the seat pad 24 is formed by this foam molding, foam material of the seat pad 24 penetrates the back surface member 22 of the seat cover 16, so as to be integrated with the seat cover 16 that includes the cover 18, as shown in FIG. 3. Then, the recessed portion 30 corresponding to the protrusion 44 of the upper die 40 shown in FIG. 2 is formed on the surface of the formed seat pad 24, as shown in FIG. 3. FIG. 3 is a view showing a state in which the upper die 40 is released (i.e., separated) from the lower die 38. As is evident from the drawing, at the location of the recessed portion 30, the back surface member 22 of the seat cover 16 is integrated following the shape of the recessed portion 30 of the seat pad 24, and the cover 18 and the middle member 20 of the seat cover 16 are in a state recessed inward along the protrusion 44 of the upper die 40 during foam molding shown in FIG. 2, but are then pulled on by tension following the shape of the surface of the seat pad 24 except for the shape of the recessed portion 30, as shown in FIG. 3. As a result, the space 28 is formed between the middle member 20 and the back surface member 22 at the location of the recessed portion 30. That is, the space 28 resulting from the recessed portion 30 of the seat pad 24 is formed between the seat pad 24 and the cover 18 of the invention. As described above as well, the foam material that penetrates the seat cover 16 during foam molding will not penetrate to the position of the middle member 20 because the back surface member 22 is formed by a low air permeable laminate, so the formation of the space 28 between the back surface member 22 and the middle member 20 at the position of the recessed portion 30 will not be effected. Accordingly, the space 28 is able to be reliably formed on the back side of the cover 18, at the position of the middle member 20, thus facilitating bending deformation of the cover 18. As a result, the cover 18 is able to bend easily even if the end edge 26x of the front shield 26A moves while contacting the cover 18. Therefore, damage is able to be minimized, so a good appearance is able to be maintained for a long time.

Figure 4:
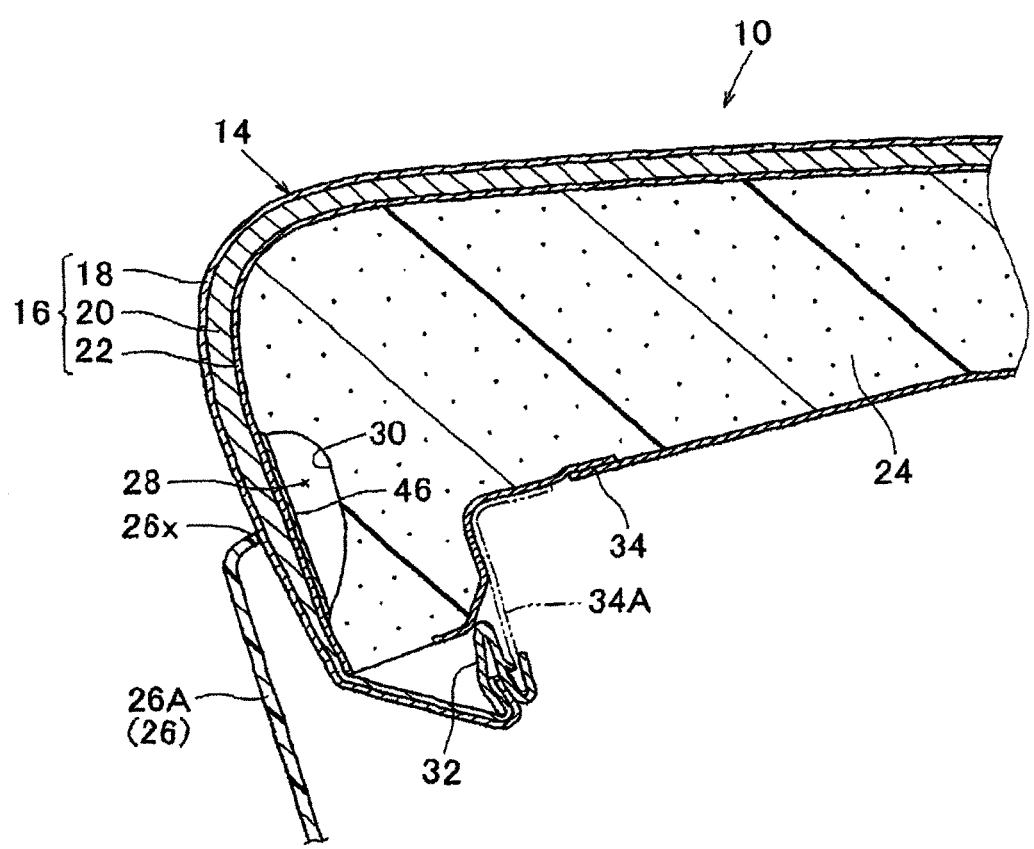
FIG. 4 is a sectional view of a modified example of the example embodiment shown in FIG. 1.

FIG. 3 is a view of a modified example of the forming method of the space 28 formed in the recessed portion 30 of the seat pad 24. In the example embodiment described above, means by which the cover 18 of the invention will not be integrated with the seat pad 24 when the seat pad 24 is foam molded is configured such that the back surface member 22 and the middle member 20 of the seat cover 16 are not integrated, but are instead able to separate. In the modified example shown in FIG. 4, a film 46 through which the foam material is unable to pass is adhered at the location of the back surface member 22 of the seat cover 16 that corresponds to the location of the recessed portion 30 of the seat pad 24. As a result, when the upper die 40 is released after the recessed portion 30 has been formed by the protrusion 44 of the upper die 40 when the seat pad 24 is foam molded, the entire seat cover 16 to which the film 46 is adhered separates from the surface of the recessed portion 30 due to the tension, and follows the shape of the surface of the seat pad 24, except for the recessed portion 30, thus enabling the space 28 to be formed in the recessed portion 30. In this modified example, when placing the seat cover 16 in the foaming chamber 42, the seat cover 16 is able to be placed while visually recognizing the position where this film 46 is adhered, so the film 46 is able to be reliably placed onto the upper die 40.

Figure 5:
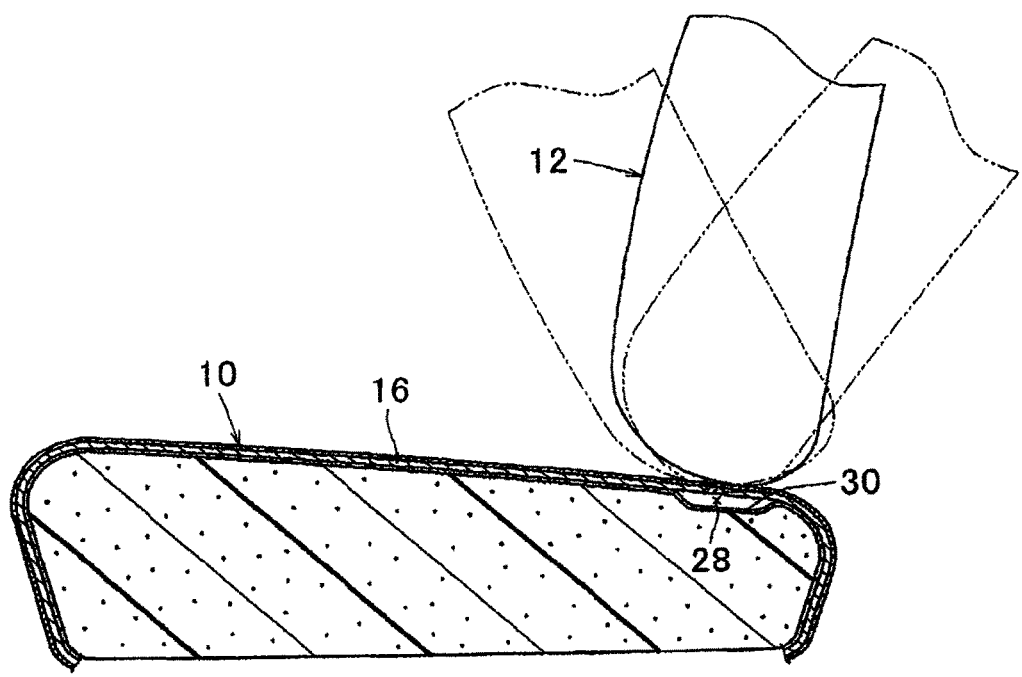
FIG. 5 is a view showing a frame format of a modified example in which a recessed portion is provided in a different position.

FIG. 5 is a view of a modified example of the position of the recessed portion 30 formed on a seat structure member of the seat cushion 10. In the modified example shown in FIG. 5, the recessed portion 30 is formed at a joining portion of the seat cushion 10, which joins with a seat back 12 at a rear portion of the seat cushion 10. The seat back 12 tilts forward and backward by a reclining mechanism, so the seat back 12 moves while a lower portion of thereof is in slidingly contact with the surface of the seat cushion 10. By forming the recessed portion 30 at this location and making the cover 18 easier to bend, damage to the cover is able to be suppressed so a good appearance is able to be maintained for a long time, just as described above.

While example embodiments of the invention have been described, the invention may also be carried out by other modes aside from the example embodiment described above. For example, the shape of the recessed portion formed on the surface of the seat back is an angular shape in the example embodiment described above. Alternatively, a space that is round or the like may also be formed. In this case, the shape is preferably one that facilitates release at the time of mold release. In particular, with a forming die that is matched by pivoting, as the forming die described above is, the shape is preferably a recessed shape that takes the pivot direction into account. Also, in the example embodiment described above, the recessed portion is formed on the seat cushion, but in the invention, the recessed portion may also be formed on a seat back or a headrest or the like.

What is claimed is:

1. A manufacturing method of a seat structure member, comprising:
   forming a protrusion that protrudes inward on an inside surface of a portion that forms
   a foaming chamber for a seat pad, on one die and another die that form the foaming chamber, the protrusion is formed at a position corresponding to a front surface of the seat pad;
   applying, to a cover, a region that will not be integrated with the seat pad when the seat pad is foam molded, at a location on the cover that corresponds to a location of the protrusion when placing the cover on the inside surface of the foaming chamber;
   arranging the cover following a shape of the protrusion and foam molding the seat pad;
   integrating the cover with the seat pad at portions other than the region applied to the cover by making a foam material that defines the foam molded seat penetrate a back surface member of the cover, and
   forming a space of a recessed portion between the seat pad and the cover, by releasing the one die and the other die after foam molding the seat pad.

2. The manufacturing method of the seat structure member according to claim 1, further comprising:
   providing the recessed portion formed on the surface of the seat pad at a location other than at a contact surface that is contacted by an occupant when the occupant is seated.

3. The manufacturing method of the seat structure member according to claim 1, further comprising:
   providing the recessed portion formed on the surface of the seat pad at a position corresponding to an end edge of a shield arranged on an outside surface of a seat.

4. The manufacturing method of the seat structure member according to claim 1, further comprising:
   providing the seat pad in a seat cushion; and
   forming the recessed portion on a joining portion of the seat cushion, which joins with a seat back at a rear portion of the seat cushion.

5. A manufacturing method of a seat structure member, comprising:
   forming a protrusion that protrudes inward on an inside surface of a portion that forms
   a foaming chamber for a seat pad, on one die and another die that form the foaming chamber;
   applying, to a cover, a region that will not be integrated with the seat pad when the seat pad is foam molded, at a location on the cover that corresponds to a location of the protrusion when placing the cover on the inside surface of the foaming chamber;
   arranging the cover following a shape of the protrusion and foam molding the seat pad;
   forming a space of a recessed portion between the seat pad and the cover, by releasing the one die and the other die after foam molding the seat pad,
   providing a film through which foam material is unable to pass; and
   arranging the film between the seat pad and the seat cover to avoid integrated molding of the seat pad and the cover.

6. A manufacturing method of a seat structure member, comprising:
   forming a protrusion that protrudes inward on an inside surface of a portion that forms
   a foaming chamber for a seat pad, on one die and another die that form the foaming chamber;
   applying, to a cover, a region that will not be integrated with the seat pad when the seat pad is foam molded, at a location on the cover that corresponds to a location of the protrusion when placing the cover on the inside surface of the foaming chamber;
   arranging the cover following a shape of the protrusion and subsequently foam molding the seat pad; and
   forming a space of a recessed portion between the seat pad and the cover, by releasing the one die and the other die after foam molding the seat pad.

* * * * *